(12) United States Patent
Tanabe (10) Patent No.: US 7,916,610 B2
(45) Date of Patent: *Mar. 29, 2011

(54) INFORMATION RECORDING APPARATUS, INFORMATION REPRODUCING APPARATUS, INFORMATION RECORDING METHOD, INFORMATION REPRODUCING METHOD, AND OPTICAL INFORMATION RECORDING MEDIUM

(75) Inventor: Norihiro Tanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 12/214,211

(22) Filed: Jun. 16, 2008

(65) Prior Publication Data

US 2009/0003177 A1 Jan. 1, 2009

(30) Foreign Application Priority Data

Jun. 26, 2007 (JP) ................. P2007-167271

(51) Int. Cl.
*G11B 7/00* (2006.01)
(52) U.S. Cl. .......................... 369/103; 369/94
(58) Field of Classification Search .................. None
See application file for complete search history.

(56) References Cited

U.S. PATENT DOCUMENTS

| 6,139,933 | A | 10/2000 | Van Wijk |
| 6,909,684 | B2* | 6/2005 | Kawano et al. ............... 369/103 |
| 2002/0181253 | A1 | 12/2002 | Watanabe |
| 2003/0133391 | A1 | 7/2003 | Holtslag et al. |
| 2007/0253307 | A1 | 11/2007 | Mashimo |
| 2007/0285751 | A1* | 12/2007 | Kim ............................... 359/10 |

FOREIGN PATENT DOCUMENTS

| JP | 2003-110999 | 4/2003 |
| JP | 2004-320441 | 11/2004 |
| JP | 2005-303511 | 10/2005 |

* cited by examiner

*Primary Examiner* — Joseph Haley
(74) *Attorney, Agent, or Firm* — Wolf, Greenfield & Sacks, P.C.

(57) ABSTRACT

An information recording apparatus for recording information on a multi-layered optical information recording medium having a recording material, which changes quality according to light intensity of an irradiated light, and having an altered layer in which the recording material is already altered and a non-altered layer in which the recording material is not yet altered alternately existing in plurals is provided. The information recording apparatus includes a light source for emitting a recording light having coherency; a light path branching unit for branching a light path of the light into a first light path and a second light path; focal position control units for controlling focal positions of the light in the first and the second light path; and objective lenses for collecting the lights in the first and the second light path on the recording medium.

24 Claims, 8 Drawing Sheets

——— OUTER DIAMETER OF LIGHT FLUX A

-------- OUTER DIAMETER OF LIGHT FLUX B

INFORMATION RECORDING APPARATUS, INFORMATION REPRODUCING APPARATUS, INFORMATION RECORDING METHOD, INFORMATION REPRODUCING METHOD, AND OPTICAL INFORMATION RECORDING MEDIUM

CROSS-REFERENCE TO RELATED APPLICATION

The present invention contains subject matter related to Japanese Patent Application JP 2007-167271 filed in the Japan Patent Office on Jun. 26, 2007, the entire contents of which being incorporated herein by reference.

BACKGROUND OF THE INVENTION

1. Field of the Invention

The present invention relates to an information recording apparatus, an information reproducing apparatus, an information recording method, an information reproducing method, and an optical information recording medium.

2. Description of the Related Art

In the past, disc-shaped optical discs are being widespread used as optical information recording media, and generally, CD (Compact Disc), DVD (Digital Versatile Disc), Blu-Ray Disc (registered trademark, hereinafter also referred to as BD), and the like are being used.

In an optical disc device responding to such optical disc, various information such as various contents of music content, picture content, and the like or various data for computers, and the like are being recorded on the optical disc. In recent years, in particular, larger capacity of the optical disc is being desired with increase in the amount of information due to higher resolution of pictures, higher sound quality of music, and the like, and demand for increase in the number of contents to be recorded on one optical disc.

One method of increasing the capacity of the optical disc is proposed in which information is recorded by interfering light beams of two systems and forming microscopic holograms in the recording medium (see e.g., Japanese Patent Application Laid-Open No. 2006-78834).

A method of enhancing the recording density by stacking the optical discs of the related art into multi-layers (see e.g., I. Ichimura et al, Technical Digest of ISOM'04, pp. 52, October 11-15, Jeju Korea) is being developed as another method of increasing the capacity of the optical disc.

SUMMARY OF THE INVENTION

However, in the method described in Japanese Patent Application Laid-Open No. 2006-78834, an advanced control of simultaneously aligning the focal positions of two types of light beams at a location desired to record the information is performed on a rotating and vibrating optical disc, and thus the configuration of the optical disc device using the relevant method becomes complex, and stable recordation or reproduction of information becomes difficult.

When holograms are formed in the optical disc using the method described in the Technical Digest, the region other than the vicinity of the focus of the light irradiated to form the hologram tends to alter, and such altered region causes crosstalk noise in time of hologram reproduction, whereby detection of a signal having a satisfactory signal to noise ratio becomes difficult.

In view of the above issues, it is desirable to provide a novel and improved information recording apparatus capable of stably recording or reproducing information, and capable of obtaining a satisfactory signal to noise ratio, an information reproducing apparatus, an information recording method, an information reproducing method, and an optical information recording medium.

According to an embodiment of the present invention, there is provided an information recording apparatus for recording information on a multi-layered optical information recording medium having a recording material, which changes quality according to light intensity of an irradiated light, and having an altered layer in which the recording material is already altered and a non-altered layer in which the recording material is not yet altered alternately existing in plurals; the information recording apparatus including a light source for emitting a recording light of a predetermined wavelength having coherency; a light path branching unit for branching a light path of the recording light emitted from the light source into a first light path and a second light path; focal position control units, respectively arranged at a post-stage of the light path branching unit, for controlling focal positions of the recording light in the first light path and the recording light in the second light path; and objective lenses, respectively arranged at a post-stage of the focal position control unit, for collecting the recording light in the first light path and the recording light in the second light path on the optical information recording medium; wherein the recording light in the first light path perpendicularly enters the optical information recording medium from a surface on one side of the optical information recording medium; the recording light in the second light path perpendicularly enters the optical information recording medium from a surface on the other side of the optical information recording medium; and a hologram corresponding to a standing wave generated by interference between the recording light in the first light path and the recording light in the second light path is recorded as a recording mark.

According to such configuration, the light source emits a recording light of a predetermined wavelength having coherency, the light branching unit branches the light path of the recording light emitted from the light source into a first light path and a second light path, the focal position control units respectively control the focal positions of the recording light in the first light path and the recording light in the second light path, and the objective lenses respectively collect the recording light in the first light path and the recording light in the second light path on the optical information recording medium. The recording light in the first light path and the recording light in the second light path interfere in the optical information recording medium and generate a standing wave, whereby the recording material changes quality according to the standing wave and the hologram is recorded. The optical information recording medium according to the present invention has the altered layer in which the recording material is altered and the non-altered layer in which the recording material is not altered alternately existing in plurals, and thus the hologram to be recorded can be localized, and information excelling in signal to noise ratio can be recorded.

The focal position control units may respectively control the recording light in the first light path and the recording light in the second light path so that the recording light in the first light path and the recording light in the second light path become the same focal position.

The focal depths of the recording light in the first light path and the recording light in the second light path may be equal to a thickness of the altered layer and/or non-altered layer.

The focal position control units may respectively control the focal positions of the recording light in the first light path and the recording light in the second light path so as to be a position where the non-altered layer exists.

The focal position control units may respectively control the focal positions of the recording light in the first light path and the recording light in the second light path so as to be a position where the altered layer exists.

The focal position control unit may be configured by one or a plurality of optical members; and the focal positions of the recording light in the first light path and the recording light in the second light path may be controlled by changing the position of the one or the plurality of optical members.

The focal position control unit may be configured by a relay lens or a collimator lens.

According to another embodiment of the present invention, there is provided an information reproducing apparatus for reading and reproducing a recorded hologram from an optical information recording medium having a recording material, which changes quality according to light intensity of an irradiated light, having an altered layer in which the recording material is already altered and a non-altered layer in which the recording material is not yet altered alternately existing in plurals, and having information recorded as the hologram in the altered layer or the non-altered layer; the information reproducing apparatus including a light source for emitting a reading light having a predetermined wavelength; a focal position control unit for controlling a focal position of the reading light emitted from the light source; an objective lens arranged at a post-stage of the focal position control unit, for collecting the reading light; and a light detector for detecting a returning light corresponding to the reading light from the hologram.

According to the relevant configuration, the light source emits a reading light of a predetermined wavelength, the focal position control unit controls the focal position of the reading light emitted from the light source, the objective lens collects the reading light on the optical information recording medium, and the light detector detects the returning light from the hologram recorded in the optical information recording medium. The optical information recording medium according to the present invention has the altered layer in which the recording material is altered and the non-altered layer in which the recording material is not altered alternately existing in plurals, and the localized hologram stored therein, and thus signal having a satisfactory signal to noise ratio can be reproduced.

A focal depth of the reading light may be equal to a thickness of the altered layer and/or the non-altered layer.

A wavelength of the reading light may be the same as a wavelength of a recording light used to record the hologram.

The focal position control unit may control the focal position of the reading light so as to be a position where the non-altered layer exists; and the light detector may detect the returning light from the hologram in the non-altered layer.

The focal position control unit may control the focal position of the reading light so as to be a position where the altered layer exists; and the light detector may detect the returning light from the hologram in the altered layer.

The focal position control unit may be configured by one or a plurality of optical members; and the focal position of the reading light may be controlled by changing the position of the one or the plurality of optical members.

The focal position control unit may be configured by a relay lens or a collimator lens.

The optical information recording medium may be initialized by two initialization light beams; one of the two initialization light beams may enter the optical information recording medium from a surface on one side of the optical information recording medium; and the other of the two initialization light beams may enter the optical information recording medium from a surface on the other side of the optical information recording medium.

Magnitudes of incident angles with respect to the surfaces of the optical information recording medium of the two initialization light beams may be equal.

The initialization may be performed using the initialization light beam of wavelength $\lambda$[nm] such that thicknesses of the altered layer and the non-altered layer become $\Delta D$[nm]; and the incident angle $\theta$ of the two initialization light beams may take a value obtained from Equation 1.

$$\theta = \sin^{-1}\left(\frac{\lambda}{2\Delta D}\right) \quad \text{(Equation 1)}$$

The optical information recording medium may be initialized by an initialization light beam of a wavelength having light sensitivity with respect to the recording material.

The initialization light beam may be a parallel light beam.

A beam diameter of the initialization light beam may have a size for irradiating the entire surface of the recording material.

According to another embodiment of the present invention, there is provided an information recording method for recording information as a hologram on a multi-layered optical information recording medium having a recording material, which changes quality according to light intensity of an irradiated light, and having an altered layer in which the recording material is already altered and a non-altered layer in which the recording material is not yet altered alternately existing in plurals; the information recording method including the steps of branching a light path of a recording light of a predetermined wavelength having coherency emitted from a light source into a first light path and a second light path; perpendicularly entering the recording light in the first light path from a surface on one side of the optical information recording medium, and perpendicularly entering the recording light in the second light path from a surface on the other side of the optical information recording medium; and recording a hologram generated by interference of the recording light in the first light path and the recording light in the second light path as a recording mark.

According to the relevant configuration, the light path of a recording light of a predetermined wavelength having coherency emitted from a light source is branched into a first light path and a second light path in the step of branching the light path of the recording light; the recording light in the first light path is perpendicularly entered from a surface on one side of the optical information recording medium and the recording light in the second light path is perpendicularly entered from a surface on the other side of the optical information recording medium in the step of entering the recording light in the optical information recording medium; and the recording material is altered by a standing wave generated by interference of the recording light in the first light path and the recording light in the second light path, and the hologram is recorded as a recording mark in the step of recording the hologram. The optical information recording medium according to the present invention has the altered layer in which the recording material is altered and the non-altered layer in which the recording material is not altered alternately existing in plurals, and thus the hologram can be recorded in a localized manner, and information excelling in signal to noise ratio can be recorded.

According to another embodiment of the present invention, there is provided an information reproducing method for reading and reproducing a recorded hologram from an optical information recording medium having a recording material, which changes quality according to light intensity of an irradiated light, having an altered layer in which the recording material is already altered and a non-altered layer in which the recording material is not yet altered alternately existing in plurals, and having information recorded as the hologram in the altered layer or the non-altered layer; the information reproducing method including the steps of controlling, with respect to a reading light having a predetermined wavelength emitted from a light source, a focal position of the reading light and irradiating the reading light on the hologram in a predetermined layer of the optical information recording medium; detecting a returning light of the reading light from the hologram; and generating a reproduction signal of the information based on the detected returning light.

According to the relevant configuration, the reading light is irradiated on the hologram recorded in a predetermined layer of the optical information recording medium after controlling the focal position of the reading light with respect to the reading light having a predetermined frequency emitted from a light source in the step of irradiating the reading light; the returning light corresponding to the reading light irradiated on the hologram is detected in the step of detecting the returning light; and the reproduction signal of the information is generated based on the detected returning light in the step of generating a reproduction signal. In the information reproducing method according to the present invention, the returning light from the hologram localized in the optical information recording medium is detected, and a signal having a satisfactory signal to noise ratio can be reproduced.

According to another embodiment of the present invention, there is provided a multi-layered optical information recording medium having a recording material, which changes quality according to light intensity of an irradiated light, wherein an altered layer in which the recording material is already altered and a non-altered layer in which the recording material is not yet altered alternately exist in plurals; information is recorded as a hologram in the altered layer or the non-altered layer; and the hologram recorded in the altered layer or the non-altered layer contacts the non-altered layer or the altered layer adjacent to the altered layer or the non-altered layer recorded with the hologram.

According to the embodiments of the present invention described above, stable recordation and reproduction of information are performed, and a satisfactory signal to noise ratio can be obtained.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment (Regarding Optical Information Recording Medium 10)

Figure 1:
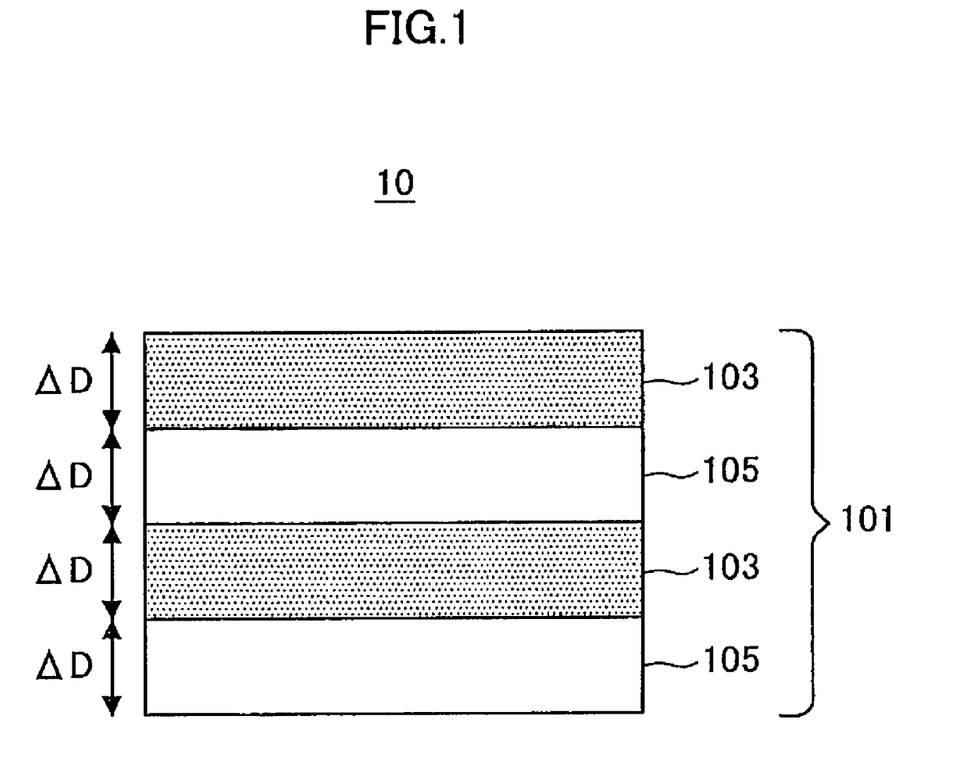
FIG. 1 is an explanatory view describing an optical information recording medium according to one embodiment of the present invention.
Figure 2:
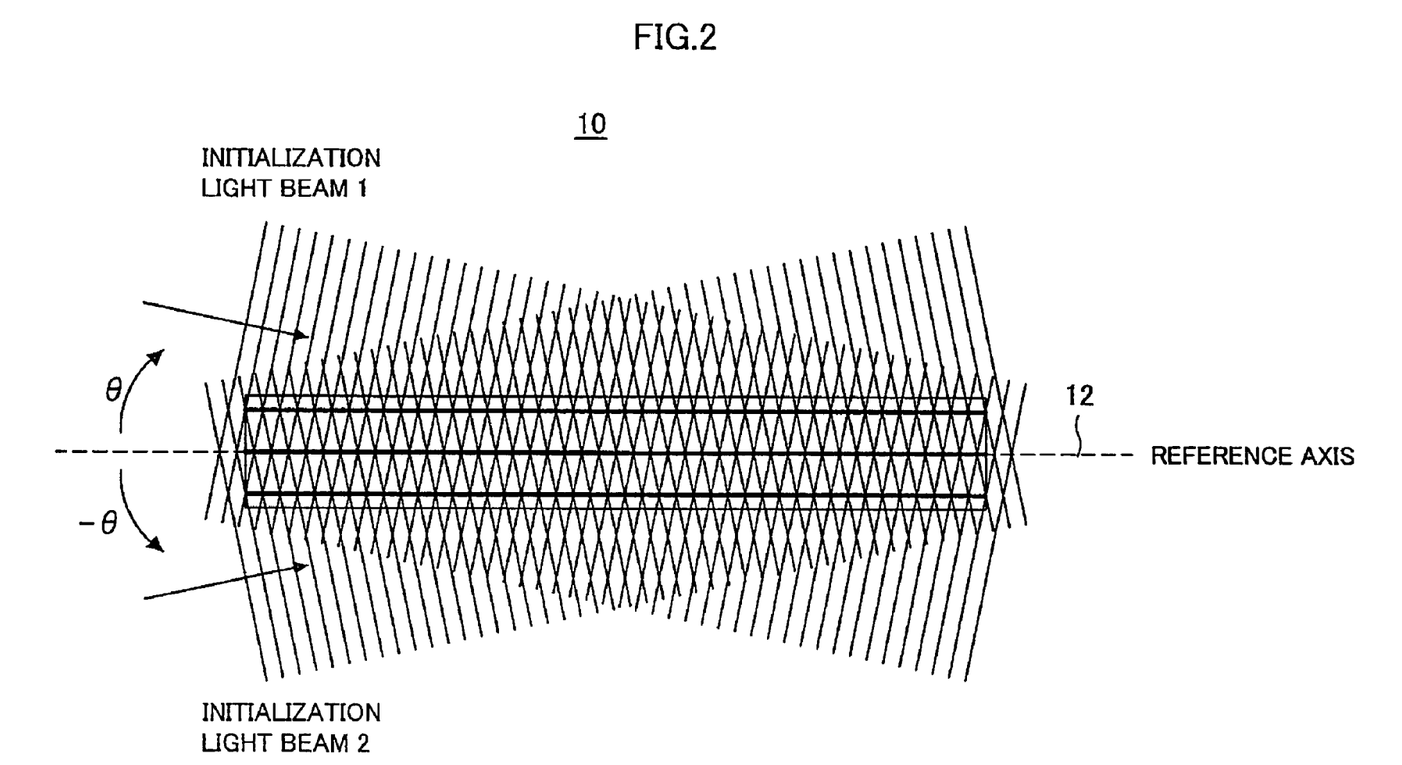
FIG. 2 is an explanatory view describing the optical information recording medium according to the embodiment.

First, an optical information recording medium used in an information recording apparatus and an information reproducing apparatus according to the first embodiment will be described in detail with reference to FIGS. 1 and 2. FIGS. 1 and 2 are explanatory views for describing the optical information recording medium 10 according to the present embodiment.

The optical information recording medium 10 according to the present embodiment includes a recording material 101 which can change quality according to the light intensity of an irradiated light; and a cover layer (not shown) arranged on both sides of the recording material 101. The optical information recording medium 10 may be formed to a square plate shape or a rectangular plate shape, or may be formed to a disc shape such as an optical disc.

The recording material 101 is a compound that changes quality by light of a predetermined wavelength. The recording material 101 is altered through heating by energy of light or as a result of various changes that occur by the energy of the light itself. The change that occurs in the recording material 101 includes physical changes such as change in hardness etc. of the recording material 101 and phase change of the recording material 101 from crystal phase to amorphous phase or from amorphous phase to crystal phase; chemical changes including change of the recording material 101 to a new compound or precipitation or aggregation of the newly generated compound such as change of monomer to oligomer or polymer and cross linkage of polymers due to photochemical reaction in the recording material 101; and the like.

The recording material 101 in which the changes described above may occur uses thermoplastic such as heat curing resin; photopolymer such as photo-polymerized photopolymer and photo cross linked photopolymer; photorefractive crystal using crystals of ferroelectric material and paraelectric material; hologram recording material etc. The recording material according to the present embodiment is not limited to the above, and an arbitrary material may be used as long as it is a substance which quality changes by light irradiation. The time necessary for initialization process and signal recording process described below is determined by light sensitivity etc. of the recording material 101, and thus the time necessary for initialization and the transfer rate in time of recording can be enhanced by using recording material having satisfactory light sensitivity.

The cover layer is a layer formed using a material having sufficient transmissivity with respect to the wavelength of the initialization light beam (in other words, material that does not absorb light of wavelength of the initialization light beam), where the thickness of the cover layer is appropriately adjusted so that the necessary transmissivity of the initialization light beam is obtained. The cover layer may be formed using glass substrate, plastic resin substrate made of polycarbonate etc., and the like.

If the performance and the durability necessary for the optical information recording medium 10 are realized with the recording material 101 alone, the cover layer may not be arranged on both sides of the recording material 101.

As shown in FIG. 1, the recording material 101 of the optical information recording medium 10 described above is initialized by a predetermined initialization process such that a layer (non-altered layer) 103 in which the recording material 101 is not yet altered, and a layer (altered layer) 105 that is already altered alternately exist in plurals. The non-altered layer 103 and the altered layer 105 alternately exist in plurals so that the optical information recording medium 10 functions as an information recording medium having a so-called threshold characteristic.

As shown in FIG. 2, the initialization process of the optical information recording medium 10 is carried out using two initialization light beams (initialization light beam 1 and initialization light beam 2). A parallel light beam of a wavelength having coherency and having light sensitivity with respect to the recording material 101 is used for the relevant initialization light beams. As shown in FIG. 2, the initialization light beam 1 enters from a surface on one side of the optical information recording medium 10, and the initialization light beam 2 enters from the surface on the other side of the optical information recording medium 10. In this case, the light path of each initialization light beam is adjusted such that the magnitude of an incident angle to the optical information recording medium 10 of the initialization light beam 1 and the magnitude of an incident angle to the optical information recording medium 10 of the initialization light beam 2 become equal. The incident angle to the optical information recording medium of the initialization light beam is defined as an angle formed by an optical axis of the initialization light and a reference axis 12 parallel to the surface of the optical information recording medium 10. The beam diameters of the initialization light beam 1 and the initialization light beam 2 preferably have a size capable of irradiating the entire surface of the optical information recording medium 10.

When the initialization light beam 1 and the initialization light beam 2 having coherency enter the optical information recording medium 10, such initialization light beams interfere in the optical information recording medium 10, thereby generating a standing wave in the recording material 101. The recording material 101 of the optical information recording medium 10 physically and/or chemically changes quality due to the intensity distribution of the standing wave. As a result, the non-altered layer 103 and the altered layer 105 as shown in FIG. 1 are alternately formed inside the optical information recording medium 10. In other words, the initialization process can also be considered as a process of irradiating light of a predetermined wavelength on the optical information recording medium 10, and recording a large hologram over the entire optical information recording medium 10. When the incident angles of the initialization light beam 1 and the initialization light beam 2 are ±θ with respect to the reference axis 12 (i.e., when the incident angles of the initialization light beam 1 and the initialization light beam 2 are symmetric with respect to the reference axis 12), the interface between the non-altered layer 103 and the altered layer 105 becomes parallel to the reference axis 12.

The thickness ΔD[nm] of the layers of the non-altered layer 103 and the altered layer 105 formed in the recording material 101 of the optical information recording medium 10 depend on the standing wave generated in the optical information recording medium 10. When the wavelength of the initialization light beam entering the optical information recording medium 10 is λ[nm] and the initialization light beam enters the optical information recording medium 10 at an incident angle θ, the thickness ΔD of the layer can be expressed with the following Equation 101.

$$\Delta D \propto \frac{\lambda}{2\sin\theta} \quad \text{(Equation 101)}$$

The wavelength λ of the initialization light beam is fixed to a wavelength having light sensitivity with respect to the recording material 101 of the optical information recording medium 10, and thus the thickness of the layers of the non-altered layer 103 and the altered layer 105 can be controlled to an arbitrary value and the number of non-altered layer 103 and altered layer 105 to be formed may be controlled by controlling the incident angle θ to the optical information recording medium 10.

In other words, the thickness of the non-altered layer 103 and the altered layer 105 can be made to the desired thickness by performing a control such that the incident angle θ to the optical information recording medium 10 of the initialization light beam becomes a value calculated in the following Equation 102.

$$\theta = \sin^{-1}\left(\frac{\lambda}{2\Delta D}\right) \quad \text{(Equation 102)}$$

The non-altered layer 103 or the altered layer 105 formed in the recording material 101 of the optical information recording medium 10 serve as recording layers on which various information are recorded. In this case, whether to use the non-altered layer 103 as the recording layer or to use the altered layer 105 as the recording layer can be appropriately selected according to alteration that occurred in the recording material 101.

The optical information recording medium 10 performed with initialization is definitely segmented to a layer (recording layer) capable of recording information and a layer not capable of recording information by being alternately formed with the non-altered layer 103 and the altered layer 105 in the recording material 101. Therefore, the optical information recording medium 10 performed with initialization has a so-called threshold characteristic. The thickness ΔD of the non-altered layer 103 and the altered layer 105 is preferably less than or equal to a focal depth in a recording optical system as hereinafter described.

A case in which two non-altered layers 103 and two altered layers 105 are formed is illustrated in FIG. 1, but the number of non-altered layer 103 and the altered layer 105 to be formed in the recording material 101 of the optical information recording medium 10 is not limited to such example, and a multi-layer structure including an arbitrary number of layers may be formed.

If initialization is performed on the optical information recording medium 10 using photo-polymerized photopolymer and the like as the recording material 101, the photo-polymerization reaction advances according to the intensity distribution of the standing wave generated in the optical information recording medium 10, and a layer (non-altered layer 103) in which the monomers in the recording material 101 exist as monomers and a layer (altered layer 105) in which the monomers in the recording material 101 are polymerized to polymers are formed. In the altered layer 105, the light cross linking reaction may advance in addition to the photo-polymerization reaction.

(Regarding Information Recording Apparatus 20)

Figure 3:
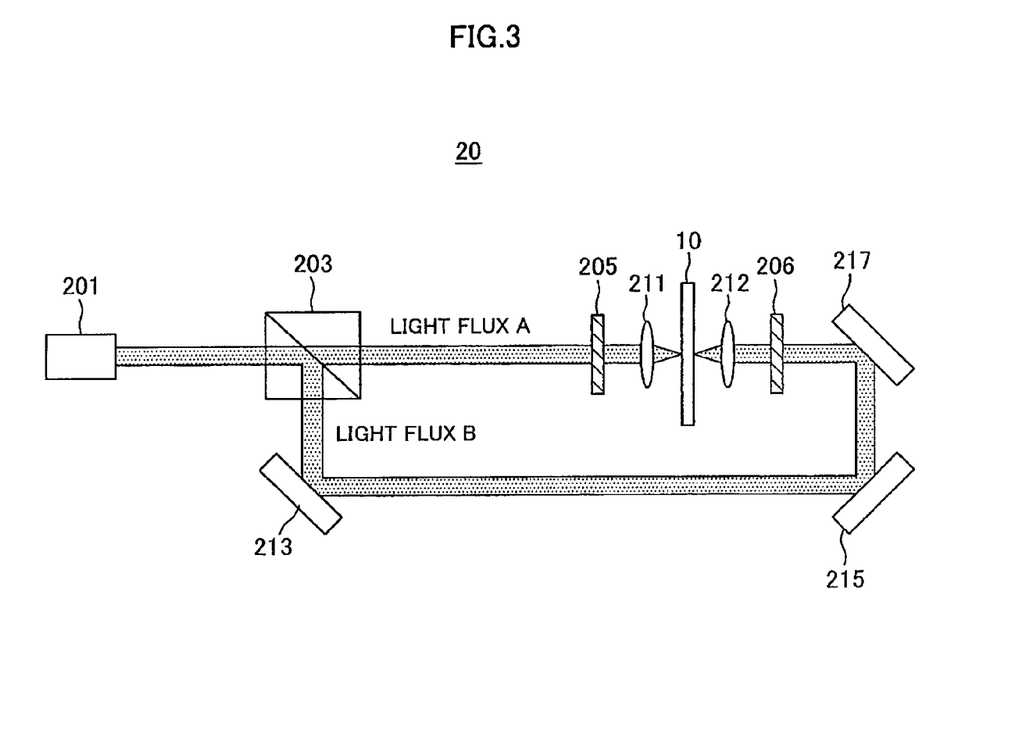
FIG. 3 is an explanatory view describing an information recording apparatus according to the embodiment.
Figure 4:
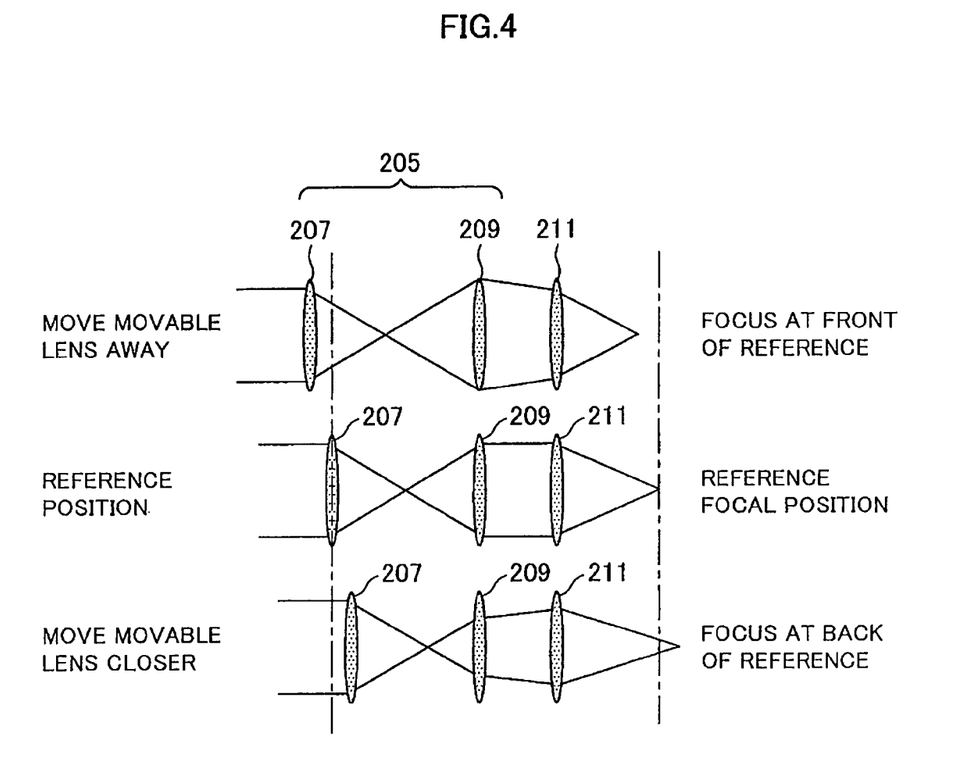
FIG. 4 is an explanatory view describing one example of a focal position control unit according to the embodiment.

An information recording apparatus 20 according to the present embodiment will now be described in detail with reference to FIGS. 3 and 4. FIG. 3 is an explanatory view describing the information recording apparatus 20 according to the present embodiment, and FIG. 4 is an explanatory view describing one example of a focal position control unit according to the present embodiment.

The information recording apparatus 20 according to the present embodiment is configured to integrally control the entire body by means of a recording apparatus control unit (not shown) including CPU (Central Processing Unit), ROM (Read Only Memory), RAM (Random Access Memory), and the like, and is able to perform information recording process on the optical information recording medium by reading out various programs such as basic program and information recording program stored in the ROM, the storage unit, and the like, which are not illustrated, and developing such programs in the RAM (not shown) and the like.

As shown in FIG. 3, the information recording apparatus 20 according to the present embodiment includes a light source 201, a beam splitter 203 serving as a light path branching unit, focal position control units 205, 206, objective lenses 211, 212, and mirrors 213, 215, 217.

The light source 201 emits a light beam of a predetermined wavelength having coherency. The wavelength, the light power, and the like of the light beam to be emitted take an arbitrary value according to the size etc. of the recording mark recorded as information on the optical information recording medium 10. A visible light beam of about 405 nm to 780 nm may be used, or a visible light beam or an ultraviolet light of less than 405 nm may be used for the wavelength of the light beam emitted by the light source 201. The light power of the light beam to be emitted is one factor for determining the time necessary for the recording material 101 of the optical information recording medium 10 to alter, and may take an arbitrary value according to the specification of the information recording apparatus 20, the material of the optical information recording medium 10, and the like.

A solid laser, a semiconductor laser, and the like can be used as one example of the light source 201.

The information recording apparatus 20 according to the present embodiment uses the light beam (light flux) emitted from the relevant light source 201 as recording light for recording information on the optical information recording medium 10.

The beam splitter 203 serving as one example of the light path branching unit branches the light path of the recording light emitted from the light source 201 into two light paths. In the example shown in FIG. 3, the recording light is branched into two lights of a light flux A passing through a first light path, and a light flux B passing through a second light path.

The focal position control unit 205 is used with the objective lens 211 hereinafter described, and controls the focal position of the light flux A or the recording light branched by the beam splitter 203. Normally, the focal position of the light flux A has the position that becomes a reference determined by focal length etc. of the objective lens 211 used in the information recording apparatus 20, but the focal position control unit 205 according to the present embodiment can change the focal position of the light flux A by using one or a plurality of optical members.

The focal position control unit 206 is used with the objective lens 212 hereinafter described, and controls the focal position of the light flux B or the recording light branched by the beam splitter 203. Normally, the focal position of the light flux B has the position that becomes a reference determined by focal length etc. of the objective lens 212 used in the information recording apparatus 20, but the focal position control unit 206 according to the present embodiment can change the focal position of the light flux B by using one or a plurality of optical members. The focal position control units 205, 206 will be described in detail below.

The objective lens 211 is arranged at the post-stage of the focal position control unit 205, and collects the light flux A or the recording light branched by the beam splitter 203 at the position of the focal length of the objective lens 211. The objective lens 212 is arranged at the post-stage of the focal position control unit 206, and collects the light flux B or the recording light branched by the beam splitter 203 at the position of the focal length of the objective lens 212. Here, the objective lens 211 and the objective lens 212 have lens properties such as focal length and focal depth of the objective lens 211 and the objective lens 212 determined so as to focus at the same location of the optical information recording medium 10.

The spot diameter of the light flux A and the light flux B can be controlled by appropriately selecting the numerical aperture (NA) of the objective lenses 211, 212. An objective lens having a numerical aperture between 0.45 and 0.85 may be selected for the objective lenses 211, 212. One biconvex lens is illustrated for the objective lenses 211, 212 in FIGS. 3 and 4, but the objective lenses 211, 212 according to the present invention are not limited thereto, and may be an aspheric lens, or an objective lens including a plurality of lenses.

The mirrors 213, 215, and 217 change the light path of the light flux B or the recording light branched by the beam splitter 203, and guide the light flux B to the focal position control unit 206. The mirrors 213, 215, and 217 may be of arbitrarily type as long as it can reflect the light flux B. A mirror angle adjustment unit (not shown) for adjusting the angle of the respective mirror may be arranged in the mirrors 213, 215, and 217.

In FIG. 3, a case of branching the light beam emitted from one light source 201 into two light paths using the beam splitter 203 and having the light beam as the recording light is described, but a plurality of light sources may be used and the light beam emitted from the plurality of light sources may be used as the recording light.

(Regarding Focal Position Control Units 205, 206)

An optical member such as a relay lens or a collimator lens may be used as the focal position control units 205, 206. In the following description, a case of using the relay lens including a movable lens 207 and a fixed lens 209 for the focal position control unit 205 will be described in detail, one example of which is shown in FIG. 4, but the focal position control units 205, 206 according to the present embodiment are not limited thereto, and an arbitrary type may be used as long as the focal position of the optical system can be controlled. The focal position control unit 206 has the same function and exhibits similar effects as the focal position control unit 205, and thus description thereof will be omitted.

The focal position control unit 205 is arranged at the pre-stage of the objective lens 211, and changes the focal position of the light flux A collected by the objective lens 211 by changing the position of the movable lens 207 with a drive device (not shown), and the like.

When the movable lens 207 is at a predetermined reference position, the relay lens collects the light flux A at the focal position that becomes a reference (reference focal position) by the objective lens 211. When the movable lens 207 is moved towards the front side of the reference position, and away from the fixed lens 209 (i.e., move the movable lens 207 towards the light source 201 side), the light flux A focuses on the front of the reference focal position. On the contrary, when the movable lens 207 is moved towards the far side from the reference position, and closer to the fixed lens 209 (i.e., move the movable lens 207 towards the objective lens 211 side), the light flux A focuses on the back of the reference focal position. Through the use of such method, the position at which the light flux A focuses can be controlled, and the light flux A can be collected at the position at where the information is to be recorded in the optical information recording medium 10.

The relevant relay lens is merely an example of the focal position control unit 205, and the focal position control unit 205 in the information recording apparatus 20 according to the present invention is not limited thereto, and a collimator lens connected with a drive device for changing the position of the lens, and the like, may be used.

(Regarding Information Recording Method)

Figure 5:
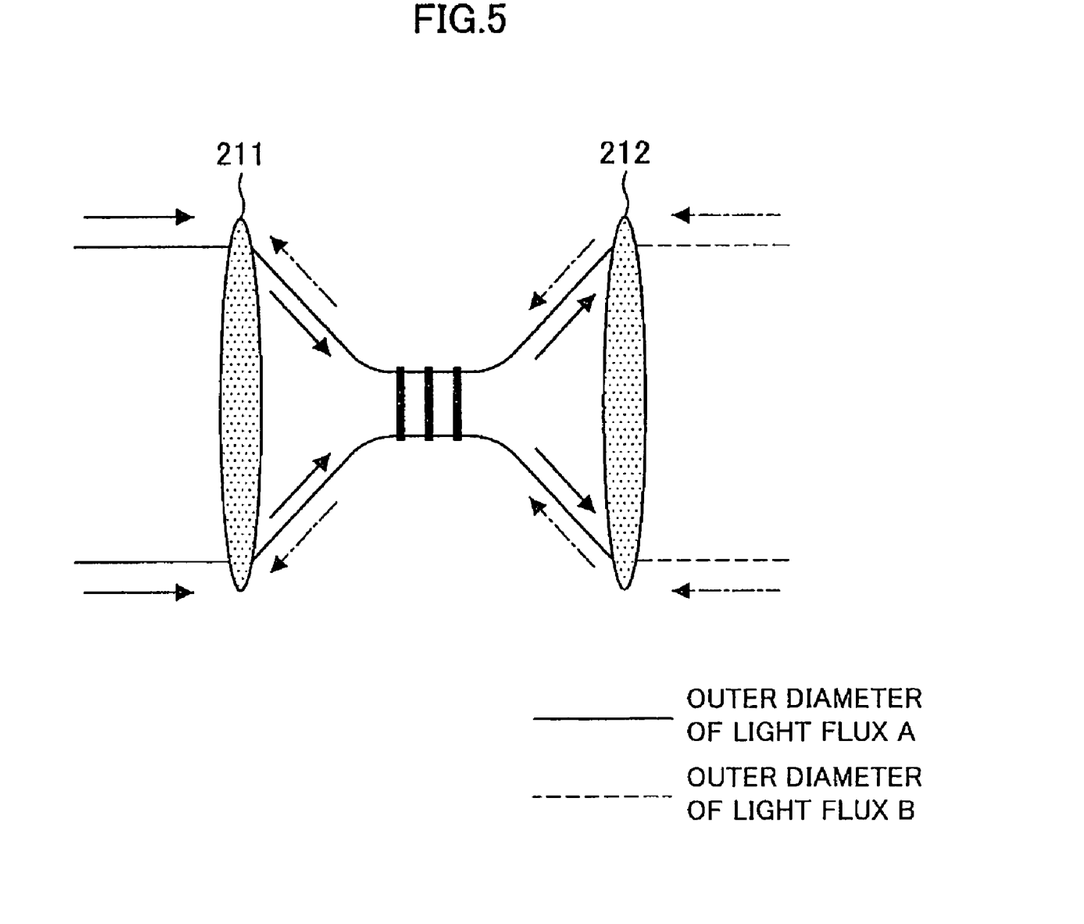
FIG. 5 is an explanatory view describing an information recording method according to the embodiment.
Figure 6:
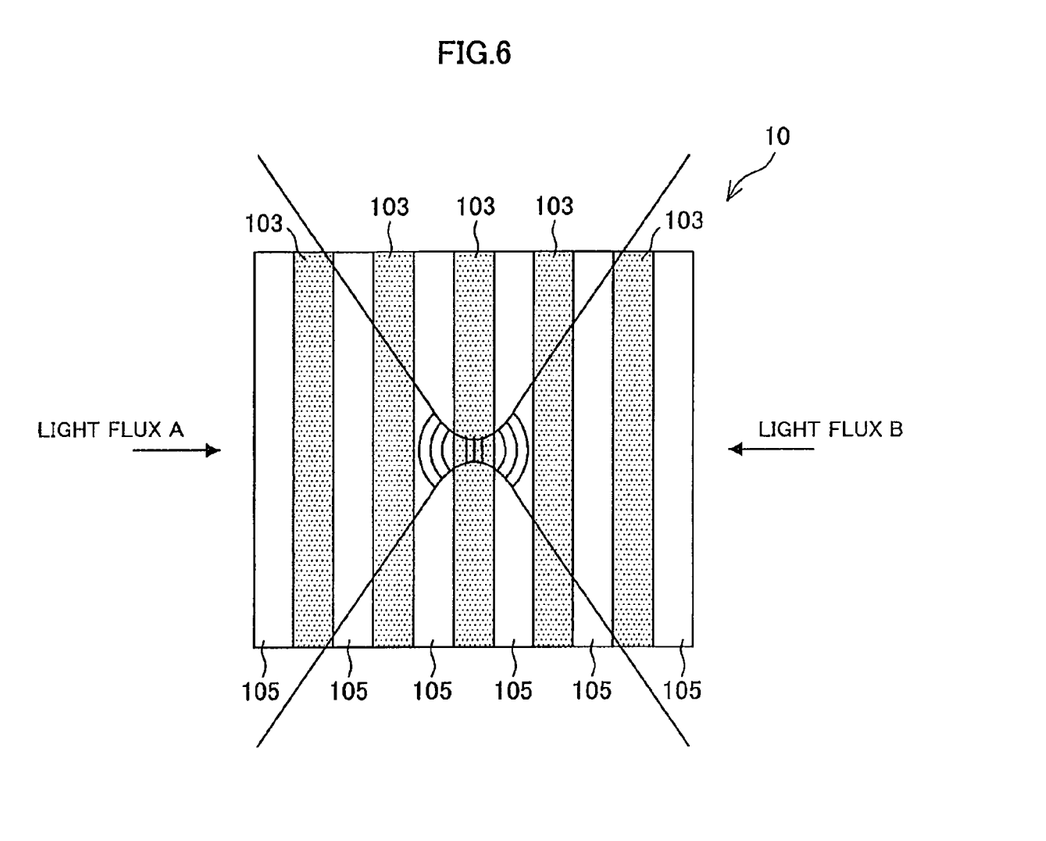
FIG. 6 is an explanatory view describing an information recording method according to the embodiment.

A method of recording information as hologram in a multi-layer optical information recording medium 10 having a so-called threshold characteristic will now be described in detail with reference to FIGS. 5 and 6. FIGS. 5 and 6 are explanatory views for describing the information recording method according to the present embodiment.

The information recording apparatus 20 according to the present embodiment records information on the optical information recording medium 10 by corresponding such that the hologram is recorded when the binarized information has a value of "1", and the hologram is not recorded when the binarized information has a value of "0".

In the information recording apparatus 20 according to the present embodiment, the light flux A passes through the objective lens 211 and perpendicularly enters the optical information recording medium 10 from a surface on one side of the optical information recording medium 10, and the light flux B passes through the objective lens 212 and perpendicularly enters the optical information recording medium 10 from a surface on the other side of the optical information recording medium 10, as shown in FIG. 5. The light flux A and the light flux B are both controlled by the focal position control units 205, 206 and the objective lenses 212, 213 so as to be collected at the non-altered layer 103 or the altered layer 105 of the optical information recording medium 10.

Since the light flux A and the light flux B are light beams having coherency, the light flux A and the light flux B collected at the same location interfere thereby generating a standing wave. As a result, the recording material 101 at the light collected location changes quality according to the generated standing wave, and microscopic holograms are recorded. That is, the information recording apparatus 20 according to the present embodiment can be considered as a device for recording a so-called L-hologram (micro-hologram) on the recording material 101 of the optical information recording medium 10.

In the optical information recording medium 10 used in the information recording apparatus 20 according to the present embodiment, the layer thickness of the non-altered layer 103 and the altered layer 105 is made equal to the focal depth of the information recording apparatus 20 by the initialization process described above. Thus, as shown in FIG. 6, the recording material of the non-altered layer 103 is altered and the hologram is recorded at the vicinity of the focus of the light flux A and the light flux B, but the hologram is difficult to be recorded in the altered layer 105 adjacent to the non-altered layer 103 to be performed with recording since the non-altered recording material does not exist.

Therefore, in the information recording apparatus 20 according to the present embodiment, the holograms localized along the optical axis direction of the recording light can be recorded in the optical information recording medium 10 to perform recordation on the optical information recording medium 10 having so-called threshold characteristic. Furthermore, since the non-altered layer 103 and the altered layer 105 exist adjacent to each other, the ends of the hologram become clear. Therefore, cross-talk noise in time of hologram reproduction can be reduced, and a satisfactory signal to noise ratio can be obtained.

(Specific Example of Recording Mark)

The hologram or the recording mark will be described below by way of specific examples of the recording material 101. For instance, when photo-polymerized photopolymer is used for the recording material 101, a monomer layer corresponding to the non-altered layer 103 and a polymer layer corresponding to the altered layer 105 are alternately formed by the initialization process. When the light flux A and the light flux B are collected at the same location of the non-altered layer 103, the monomer at the light collected location changes to polymer, and localized microscopic hologram (micro-hologram) generates.

(Regarding Information Reproducing Apparatus 30)

Figure 7:
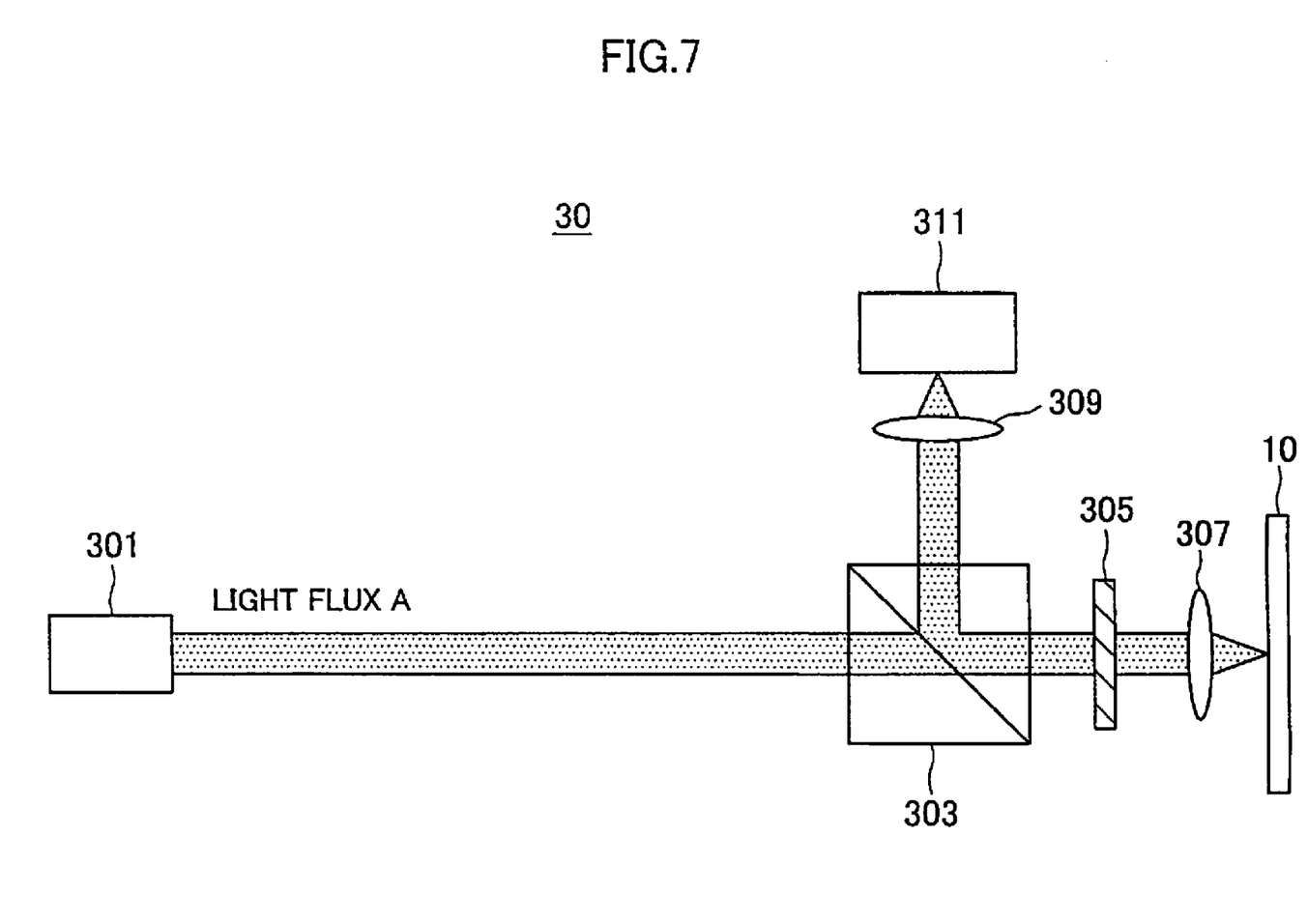
FIG. 7 is an explanatory view describing an information reproducing apparatus according to the embodiment.

The information reproducing apparatus 30 according to the present embodiment will be described in detail with reference to FIG. 7. FIG. 7 is an explanatory view for describing the information reproducing apparatus 30 according to the present embodiment.

The information reproducing apparatus 30 according to the present embodiment is configured to integrally control the entire body by means of a reproducing apparatus control unit (not shown) including CPU (Central Processing Unit), ROM (Read Only Memory), RAM (Random Access Memory), and the like, and is able to read out and reproduce information from the optical information recording medium by reading out various programs such as basic program and information reproducing program stored in the ROM, the storage unit, and the like, which are not illustrated, and developing such programs in the RAM (not shown) and the like.

As shown in FIG. 7, the information reproducing apparatus 30 according to the present embodiment includes a light source 301, a beam splitter 303 serving as a light beam branching unit, a focal position control unit 305, an objective lens 307, a light collecting lens 309, and a light detector 311, and reads out and reproduces information (hologram) recorded on the optical information recording medium 10 performed with the initialization process.

The light source 301 emits a light beam having a predetermined wavelength. The wavelength, the light power, and the like of the light beam to be emitted take an arbitrary value according to the size etc. of the recording mark recorded as information on the optical information recording medium 10. A visible light beam of about 405 nm to 780 nm may be used, or a visible light beam or an ultraviolet light of less than 405 nm may be used for the wavelength of the light beam emitted by the light source 301. The light power of the light beam to be emitted is preferably a power weaker than the recording light so as not to cause alteration in the recording material 101 of the optical information recording medium 10. The wavelength of the light beam emitted by the light source 301 may be the same wavelength as the recording light.

A solid laser, a semiconductor laser, and the like can be used as one example of the light source 301.

The information reproducing apparatus 30 according to the present embodiment uses the light beam (light flux) emitted from the relevant light source 301 as a reading light for reading out information from the optical information recording medium 10.

The beam splitter 303 serving as the light beam branching unit transmits the reading light emitted from the light source 301 towards the optical information recording medium 10 side, and branches the returning light from the hologram recorded on the optical information recording medium 10 and guides the same towards the light detector 311 side to be hereinafter described.

The focal position control unit 305 is used with the objective lens 307 hereinafter described, and controls the focal position of a light flux A or the reading light emitted from the light source 301. Normally, the focal position of the light flux A has the position that becomes a reference determined by focal length etc. of the objective lens 307 used in the information reproducing apparatus 30, but the focal position control unit 305 according to the present embodiment can change the focal position of the light flux A by using one or a plurality of optical members. The focal position control unit 305 has the same function and exhibits the same effects as the focal position control unit 203 in the information recording apparatus 20 according to the present embodiment, and thus the detailed description thereof will be omitted.

The objective lens 307 is arranged at the post-stage of the focal position control unit 305, and collects the light flux A or the reading light emitted from the light source 301 at the position of the focal length of the objective lens 307. The spot diameter of the light flux A can be controlled by appropriately selecting the numerical aperture of the objective lens 307. An objective lens having a numerical aperture between 0.45 and 0.85 may be selected for the objective lens 307. In FIG. 6, one biconvex lens is illustrated for the objective lens 307, but the objective lens 307 according to the present invention is not limited thereto, and may be an aspheric lens, or an objective lens including a plurality of lenses.

The light collecting lens 309 is arranged to collect the light beam branched by the beam splitter 303, and collects the returning light from the optical information recording medium 10 at the light detector 311 arranged at the post-stage of the light collecting lens 309. In FIG. 7, one biconvex lens is illustrated as the light collecting lens 309, but the light collecting lens 309 according to the present invention is not limited thereto, and may be an aspheric lens, or an objective lens including a plurality of lenses.

The light detector 311 detects the returning light from the optical information recording medium 10 collected by the light collecting lens 309. A light receiving element such as CCD (Charge Coupled Device) or PIN photodiode may be used for the light detector 311. In the light detector 311, the presence of the returning light is determined based on the difference in the detected light quantity. For instance, determination is made that the returning light exists if the light quantity detected by the light detector 311 is greater than or equal to a predetermined light quantity, and determination is made that the returning light does not exist if less than the predetermined light quantity. Thus, in the light detector 311, the presence of the returning light, that is, the presence of the hologram which is the recording mark can be determined by detecting the difference in light quantity.

(Regarding Information Reproducing Method)

An information reproducing method according to the present embodiment will now be described in detail with reference to FIGS. 6 and 7.

The information reproducing apparatus 30 according to the present embodiment determines that the hologram is present when the returning light is observed by the light detector 311, and determines that the hologram is not present when the returning light is not observed. The information can be read from the optical information recording medium 10 by corresponding such that the binarized information has a value of "1" when the hologram is observed, and the binarized information has a value of "0" when the hologram is not observed.

The line of binarized information detected in the above manner is assumed as the reproduction signal, and executed by the CPU etc. of the reproducing apparatus control unit (not shown) to reproduce information recorded on the optical information recording medium 10.

The light flux A (reading light) controlled so as to be collected at the predetermined focal position by the focal position control unit 305 and the objective lens 307 is collected at the predetermined non-altered layer 103 of the optical information recording medium 10, as shown in FIG. 6. The light power of the reading light is preferably a light power lower than the recording light so as not to alter the non-altered layer 103. If the location where the reading light is collected is the location subjected to signal recording by the information recording apparatus 20 (i.e., location where the hologram exists), the hologram is reproduced, and reflected light (i.e., returning light) is generated. If the location where the reading light is collected is the location not subjected to signal recording by the information recording apparatus 20 (i.e., location where the hologram does not exist), the hologram is not reproduced, and the reflected light (i.e., returning light) is not generated.

The returning light is converted to a parallel light after passing through the objective lens 307, and the returning light branched by the beam splitter 303 is collected by the light collecting lens 309 and entered to the light detector 311 to be detected by the light detector 311.

The optical information recording medium 10 according to the present embodiment has a clear interface between the non-altered layer 103 and the altered layer 105 by the above described initialization process, and in addition, has the hologram formed in the non-altered layer 103 formed so as to contact the adjacent altered layer 105. Therefore, the interface between the portion where the hologram exists and the portion where the hologram does not exist is clear even when reproducing the hologram by the information reproducing apparatus 30 according to the present embodiment, and the reading error due to stray light at the interface can be reduced. Therefore, the information reproducing apparatus 30 according to the present embodiment can reproduce information with satisfactory signal to noise ratio (SNR).

(Regarding Information Recording and Reproducing Apparatus 40)

Figure 8:
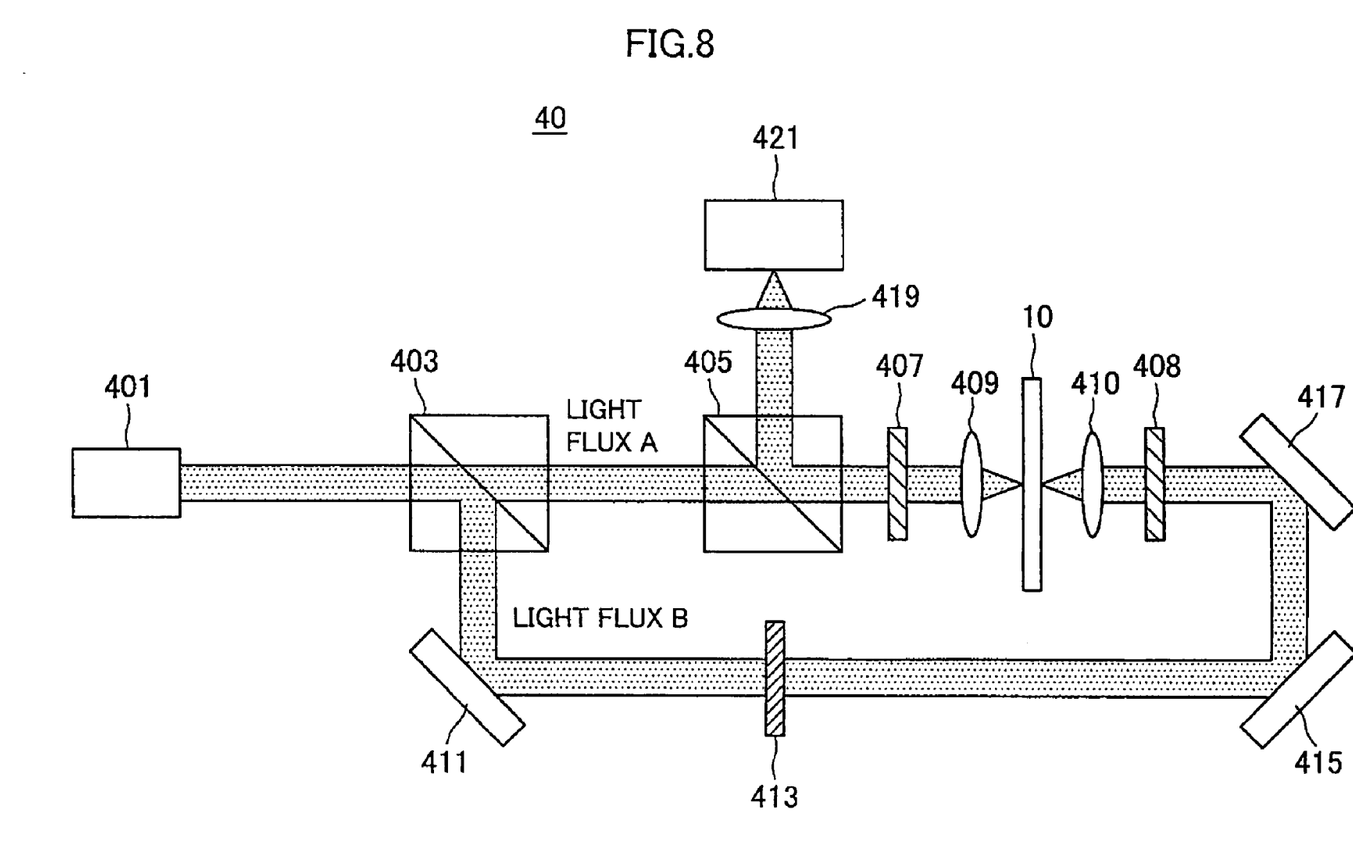
FIG. 8 is an explanatory view describing an information recording and reproducing apparatus according to the embodiment.

The information recording and reproducing apparatus 40 according to the present embodiment will be described in detail with reference to FIG. 8. FIG. 8 is an explanatory view for describing the information recording and reproducing apparatus 40 according to the present embodiment.

The information recording and reproducing apparatus 40 according to the present embodiment is configured to integrally control the entire body by means of a recording and reproducing apparatus control unit (not shown) including CPU (Central Processing Unit), ROM (Read Only Memory), RAM (Random Access Memory), and the like, and is able to write information on the optical information recording medium or read out and reproduce information from the optical information recording medium by reading out various programs such as basic program, information recording program, and information reproducing program stored in the ROM, the storage unit, and the like, which are not illustrated, and developing such programs in the RAM (not shown) and the like.

As shown in FIG. 8, the information recording and reproducing apparatus 40 according to the present embodiment includes a light source 401, a beam splitter 403, 405 serving as one example of a light beam branching unit, focal position control units 407, 408, objective lenses 409, 410, mirrors 411, 415, 417, a shutter 413, a light collecting lens 419, and a light detector 421.

The light source 401 emits a light beam of a predetermined wavelength having coherency. The wavelength of the light beam to be emitted takes an arbitrary value according to the size etc. of the hologram recorded as information on the optical information recording medium 10. A visible light beam of about 405 nm to 780 nm may be used, or a visible light beam or an ultraviolet light of less than 405 nm may be used for the wavelength of the light beam emitted by the light source 401. The light source 401 can change the light power of the light beam to emit for when recording information and for when reproducing information.

A solid laser, a semiconductor laser, and the like can be used as one example of the light source 401.

The information recording and reproducing apparatus 40 according to the present embodiment uses the light beam (light flux) emitted from the relevant light source 401 as a recording light for recording information on the optical information recording medium 10 or as a reading light for reading out information from the optical information recording medium 10.

The beam splitter 403 serving as one example of the light beam branching unit branches the light path of the light beam emitted from the light source 401 into two light paths. In the example shown in FIG. 8, the light beam emitted from the light source 401 is branched into two lights of a light flux A passing through a first light path, and a light flux B passing through a second light path.

The beam splitter 405 is arranged on the first light path, and transmits the light flux A towards the focal position control unit 407, and branches the returning light from the optical information recording medium 10 towards the light collecting lens 419 side to be hereinafter described.

The focal position control unit 407 is used with the objective lens 409 hereinafter described, and controls the focal position of the light flux A or the reading light emitted from the light source 401. Normally, the focal position of the light flux A has the position that becomes a reference determined by focal length etc. of the objective lens 409 used in the information recording and reproducing apparatus 40, but the focal position control unit 407 according to the present embodiment can change the focal position of the light flux A by using one or a plurality of optical members.

The focal position control unit 408 is used with the objective lens 410 hereinafter described, and controls the focal position of the light flux B or the recording light branched by the beam splitter 403. Normally, the focal position of the light flux B has the position that becomes a reference determined by focal length etc. of the objective lens 410 used in the information recording and reproducing apparatus 40, but the focal position control unit 408 according to the present embodiment can change the focal position of the light flux B by using one or a plurality of optical members. The focal position control units 407, 408 have the same function and exhibit similar effects as the focal position control unit 203 in the information recording apparatus 20 according to the present embodiment, and thus detailed description thereof will be omitted.

The objective lens 409 is arranged at the post-stage of the focal position control unit 407, and collects the light flux A or the light beam branched by the beam splitter 403 at the position of the focal length of the objective lens 409. The objective lens 410 is arranged at the post-stage of the focal position control unit 407, and collects the light flux B or the light beam branched by the beam splitter 403 at the position of the focal length of the objective lens 410.

The spot diameter of the light flux A and the light flux B can be controlled by appropriately selecting the numerical aperture (NA) of the objective lenses 409, 410. An objective lens having a numerical aperture between 0.45 and 0.85 may be selected for the objective lenses 409, 410. One biconvex lens is illustrated for the objective lenses 409, 410 in FIG. 8, but the objective lenses 409, 410 according to the present invention are not limited thereto, and may be an aspheric lens, or an objective lens including a plurality of lenses.

The mirrors 411, 415, and 417 change the light path of the light flux B or the recording light branched by the beam splitter 403, and guide the light flux B to the focal position control unit 408. The mirrors 411, 415, and 417 may be of arbitrarily type as long as it can reflect the light flux B. A mirror angle adjustment unit (not shown) for adjusting the angle of the respective mirror may be arranged in the mirrors 411, 415, and 417.

The shutter 413 is arranged on the second light path, and transmits or shields the light flux B by opening or closing the shutter 413 itself. A shutter control device (not shown) for controlling the open/close time of the shutter and the like is connected to the shutter 413, and the opening/closing of the shutter 413 can be controlled by the shutter control device. When recording the hologram with the information recording and reproducing apparatus 40 according to the present embodiment, the hologram can be recorded by opening the shutter 413 and irradiating the light flux B onto the optical information recording medium 10. When reproducing the hologram with the information recording and reproducing apparatus 40 according to the present embodiment, the hologram can be reproduced by closing the shutter 413 so that light flux B is not irradiated onto the optical information recording medium 10.

The light collecting lens 419 is arranged to collect the light beam branched by the beam splitter 405, and collects the returning light from the optical information recording medium 10 at the light detector 421 arranged at the post-stage of the light collecting lens 419. In FIG. 8, one biconvex lens is illustrated as the light collecting lens 419, but the light collecting lens 419 according to the present invention is not limited thereto, and may be an aspheric lens, or an objective lens including a plurality of lenses.

The light detector 421 detects the returning light from the optical information recording medium 10 collected by the light collecting lens 419. A light receiving element such as CCD (Charge Coupled Device) or PIN photodiode may be used for the light detector 421. In the light detector 421, the presence of the returning light is determined based on the difference in the detected light quantity. For instance, determination may be made that the returning light exists if the light quantity detected by the light detector 421 is greater than or equal to a predetermined light quantity, and determination may be made that the returning light does not exist if less than the predetermined light quantity. Thus, in the light detector 421, the presence of the returning light, that is, the presence of the hologram or the recording mark can be determined by detecting the difference in light quantity.

In FIG. 8, a case of branching the light beam emitted from one light source 401 into two light paths using the beam splitter 403 and having the light beam as the recording light is described, but a plurality of light sources may be used and the light beam emitted from the plurality of light sources may be used as the recording light.

(Regarding Information Recording and Reproducing Method)

The information recording and reproducing apparatus 40 according to the present embodiment records information on the optical information recording medium 10 by corresponding such that the hologram is recorded when the binarized information has a value of "1", and the hologram is not recorded when the binarized information has a value of "0". The information recording and reproducing apparatus 40 determines that the hologram is present when the returning light is observed by the light detector 421, and determines that the hologram is not present when the returning light is not observed. The information can be read from the optical information recording medium 10 by corresponding such that the binarized information has a value of "1" when the hologram is observed, and the binarized information has a value of "0" when the hologram is not observed.

The details of the information recording method and the information reproducing method are similar to the recording method in the information recording apparatus 20 and the reproducing method in the information reproducing apparatus 30 described above, and thus detailed description thereof will be omitted.

As described above, the information recording apparatus 20 and the information recording and reproducing apparatus 40 according to the present embodiment are so-called photon mode type recording apparatus for recording a so-called micro-hologram on the optical information recording medium in which the non-altered layer 103 and the altered layer 105 are alternately formed in plurals in advance. The information reproducing apparatus 30 and the information recording and reproducing apparatus 40 according to the present embodiment read and reproduce the micro-holograms from the optical information recording medium in which the non-altered layer 103 and the altered layer 105 are alternately formed in plurals in advance and in which the micro-holograms are recorded.

The information recording method according to the present embodiment can record a more localized hologram compared to a method of recording the micro-hologram of the related art in which initialization is not performed. The information reproducing method according to the present embodiment can reproduce signals having a satisfactory signal to noise ratio.

The optical information recording medium 10 according to the present embodiment does not have a complex process and the process of forming the layer structure can be carried out with only the irradiation of two parallel lights.

It should be understood by those skilled in the art that various modifications, combinations, sub-combinations and alterations may occur depending on design requirements and other factors insofar as they are within the scope of the appended claims or the equivalents thereof.

In the above embodiments, a case where the information is recorded as hologram in the non-altered layer has been described, but the information may be recorded as hologram in the altered layer.

What is claimed is:

1. An information recording apparatus for recording information on a multi-layered optical information recording medium consisting of a recording material, which changes quality according to light intensity of an irradiated light, and having an altered layer in which the recording material is already altered and a non-altered layer in which the recording material is not yet altered alternately existing in plurals, the information recording apparatus comprising:
   a light source to emit a recording light of a predetermined wavelength having coherency;
   a light path branching unit to branch a light path of the recording light emitted from the light source into a first light path and a second light path;
   focal position control units, respectively arranged at a post-stage of the light path branching unit, to control focal positions of the recording light in the first light path and the recording light in the second light path; and
   objective lenses, respectively arranged at a post-stage of the focal position control unit, to collect the recording light in the first light path and the recording light in the second light path on the optical information recording medium; wherein
   the recording light in the first light path perpendicularly enters the optical information recording medium from a first surface on one side of the optical information recording medium;
   the recording light in the second light path perpendicularly enters the optical information recording medium from a second surface on the other side of the optical information recording medium; and
   a hologram corresponding to a standing wave generated by interference between the recording light in the first light path and the recording light in the second light path is recorded as a recording mark;
   wherein focal depths of the recording light in the first light path and the recording light in the second light path are equal to a thickness of the altered layer and/or non-altered layer.

2. The information recording apparatus according to claim 1, wherein the focal position control units respectively control the recording light in the first light path and the recording light in the second light path so that the recording light in the first light path and the recording light in the second light path become the same focal position.

3. The information recording apparatus according to claim 2, wherein the focal position control units respectively controls the focal positions of the recording light in the first light path and the recording light in the second light path so as to be a position where the non-altered layer exists.

4. The information recording apparatus according to claim 2, wherein the focal position control units respectively controls the focal positions of the recording light in the first light path and the recording light in the second light path so as to be a position where the altered layer exists.

5. The information recording apparatus according to claim 1, wherein
   the focal position control unit is configured by one or more optical members; and
   the focal positions of the recording light in the first light path and the recording light in the second light path are controlled by changing the position of the one or more optical members.

6. The information recording apparatus according to claim 5, wherein the focal position control unit is configured by a relay lens or a collimator lens.

7. The information recording apparatus according to claim 1, wherein
the optical information recording medium is initialized by two initialization light beams;
one of the two initialization light beams enters the optical information recording medium from a first surface on one side of the optical information recording medium; and
the other of the two initialization light beams enters the optical information recording medium from a second surface on the other side of the optical information recording medium.

8. The information recording apparatus according to claim 7, wherein magnitudes of incident angles with respect to the surfaces of the optical information recording medium of the two initialization light beams are equal.

9. The information recording apparatus according to claim 8, wherein
the initialization is performed using the initialization light beam of wavelength $\lambda$ nm such that thicknesses of the altered layer and the non-altered layer become $\Delta D$ nm; and
the incident angle $\theta$ of the two initialization light beams takes a value obtained from Equation 1

$$\theta = \sin^{-1}\left(\frac{\lambda}{2\Delta D}\right). \quad \text{(Equation 1)}$$

10. The information recording apparatus according to claim 1, wherein the optical information recording medium is initialized by an initialization light beam of a second wavelength having light sensitivity with respect to the recording material.

11. The information recording apparatus according to claim 10, wherein the initialization light beam is a parallel light beam.

12. The information recording apparatus according to claim 10, wherein a beam diameter of the initialization light beam has a size for irradiating the entire surface of the recording material.

13. An information reproducing apparatus for reading and reproducing a recorded hologram from an optical information recording medium consisting of a recording material, which changes quality according to light intensity of an irradiated light, having an altered layer in which the recording material is already altered and a non-altered layer in which the recording material is not yet altered alternately existing in plurals, and having information recorded as the hologram in the altered layer or the non-altered layer, the information reproducing apparatus comprising:
a light source to emit a reading light having a predetermined wavelength;
a focal position control unit to control a focal position of the reading light emitted from the light source;
an objective lens arranged at a post-stage of the focal position control unit, to collect the reading light; and
a light detector to detect a returning light corresponding to the reading light from the hologram;
wherein a focal depth of the reading light is equal to a thickness of the altered layer and/or the non-altered layer.

14. The information reproducing apparatus according to claim 13, wherein the wavelength of the reading light is the same as a second wavelength of a recording light used to record the hologram.

15. The information reproducing apparatus according to claim 13, wherein
the focal position control unit controls the focal position of the reading light so as to be a position where the non-altered layer exists; and
the light detector detects the returning light from the hologram in the non-altered layer.

16. The information reproducing apparatus according to claim 13, wherein
the focal position control unit controls the focal position of the reading light so as to be a position where the altered layer exists; and
the light detector detects the returning light from the hologram in the altered layer.

17. The information reproducing apparatus according to claim 13, wherein
the focal position control unit is configured by one or more optical members; and
the focal position of the reading light is controlled by changing the position of the one or more optical members.

18. The information reproducing apparatus according to claim 17, wherein the focal position control unit is configured by a relay lens or a collimator lens.

19. The information reproducing apparatus according to claim 13, wherein
the optical information recording medium is initialized by two initialization light beams;
one of the two initialization light beams enters the optical information recording medium from a first surface on one side of the optical information recording medium; and
the other of the two initialization light beams enters the optical information recording medium from a second surface on the other side of the optical information recording medium.

20. The information reproducing apparatus according to claim 19, wherein magnitudes of incident angles with respect to the surfaces of the optical information recording medium of the two initialization light beams are equal.

21. The information reproducing apparatus according to claim 20, wherein
the initialization is performed using the initialization light beam of wavelength $\lambda$ nm such that thicknesses of the altered layer and the non-altered layer become $\Delta D$ nm; and
the incident angle $\theta$ of the two initialization light beams takes a value obtained from Equation 1

$$\theta = \sin^{-1}\left(\frac{\lambda}{2\Delta D}\right). \quad \text{(Equation 1)}$$

22. The information reproducing apparatus according to claim 13, wherein the optical information recording medium is initialized by an initialization light beam of a second wavelength having light sensitivity with respect to the recording material.

23. The information reproducing apparatus according to claim 13, wherein an initialization light beam is a parallel light beam.

24. The information reproducing apparatus according to claim 13, wherein a beam diameter of an initialization light beam has a size for irradiating the entire surface of the recording material.

* * * * *